(12) United States Patent
Kim et al.

(10) Patent No.: US 9,870,029 B2
(45) Date of Patent: Jan. 16, 2018

(54) ROLLABLE DISPLAY APPARATUS

(71) Applicant: LG Display Co., Ltd., Seoul (KR)

(72) Inventors: Yong Hee Kim, Seoul (KR); Jun Jae Lee, Paju-si (KR); Su Chan Kwon, Seoul (KR); Da Eun Min, Seoul (KR)

(73) Assignee: LG Display Co., Ltd., Seoul (KR)

( * ) Notice: Subject to any disclaimer, the term of this patent is extended or adjusted under 35 U.S.C. 154(b) by 272 days.

(21) Appl. No.: 14/793,537

(22) Filed: Jul. 7, 2015

(65) Prior Publication Data

US 2016/0187929 A1 Jun. 30, 2016

(30) Foreign Application Priority Data

Dec. 31, 2014 (KR) .................. 10-2014-0196081

(51) Int. Cl.
*G06F 3/033* (2013.01)
*G06F 1/16* (2006.01)

(52) U.S. Cl.
CPC .......... *G06F 1/1652* (2013.01); *G06F 1/1601* (2013.01); *G06F 1/1643* (2013.01)

(58) Field of Classification Search
CPC .................................................. G06F 1/1652
USPC ......................................................... 345/184
See application file for complete search history.

(56) References Cited

U.S. PATENT DOCUMENTS

| | | | | |
|---|---|---|---|---|
| 4,009,659 A * | 3/1977 | Schneider | ........... | B41F 27/1243 101/378 |
| 5,054,533 A * | 10/1991 | Lii | .......... | B60J 1/2063 160/23.1 |
| 5,205,332 A * | 4/1993 | Lii | .......... | B60J 1/2033 160/23.1 |
| 5,218,906 A * | 6/1993 | Doersam | ............... | B41F 27/125 101/378 |
| 5,226,467 A * | 7/1993 | Lii | .......... | B60J 1/2033 160/302 |
| 7,185,694 B2 * | 3/2007 | Dunn | .................... | B60J 1/2033 160/127 |
| 2008/0049003 A1* | 2/2008 | Hasegawa | ............. | G06F 1/1615 345/206 |
| 2014/0362512 A1* | 12/2014 | Hinson | ................. | G06F 15/025 361/679.21 |

(Continued)

FOREIGN PATENT DOCUMENTS

KR 10-0818170 B1 4/2008
KR 10-2011-0135827 A 12/2011

*Primary Examiner* — Jason Olson
(74) *Attorney, Agent, or Firm* — Fenwick & West LLP (57) ABSTRACT

Disclosed is a rollable display apparatus including: a flexible display panel that includes a pixel array; a roller part having a surface for winding the display panel; a first housing receiving the roller part and having a first opening through which a portion of the display panel passes; a rotational controller coupled between the roller part and the first housing, the rotational controller configured to: in a first state, enable the roller part to rotate in a first direction to unwind the display panel from the roller part but prevent rotation of the roller part in a second direction opposite the first direction, in a second state, enable the roller part to rotate in the second direction to wind the display panel onto the roller part, and switch from the first state to the second state responsive to receiving a triggering operation from a user.

15 Claims, 10 Drawing Sheets

(56) References Cited

U.S. PATENT DOCUMENTS

| | | | |
|---|---|---|---|
| 2015/0029229 A1* | 1/2015 | Voutsas | G06F 1/1652 345/661 |
| 2015/0041075 A1* | 2/2015 | Henderson | E06B 11/026 160/245 |
| 2016/0139633 A1* | 5/2016 | Lee | G06F 1/1652 345/33 |

* cited by examiner

ROLLABLE DISPLAY APPARATUS

CROSS-REFERENCE TO RELATED APPLICATIONS

This application claims the benefit of the Korean Patent Application No. 10-2014-0196081 filed on Dec. 31, 2014, which is hereby incorporated by reference as if fully set forth herein.

BACKGROUND

Field of the Invention

The present invention relates to a rollable display apparatus, and more particularly, to a rollable display apparatus in which a display panel is easily wound and unwound.

Discussion of the Related Art

A display apparatus using a flat display panel, such as a liquid crystal display (LCD) apparatus, a plasma display apparatus, an organic light emitting display apparatus, an electrophoretic display apparatus, or an electro-wetting display apparatus, is generally applied to notebook computers, portable electronic devices, televisions (TVs), and monitors.

Since flat display panels of the related art use a glass substrate having no flexibility, there is a limitation in application and use of the flat display panels. Therefore, flexible display apparatuses are made bendable by using a flexible substrate with flexibility instead of a glass substrate having no flexibility, and are attracting much attention as new display apparatuses recently.

Recently, research and development are being actively done on a rollable display apparatus in which a flexible panel is wound like a roll.

For example, a display apparatus (hereinafter referred to as a prior art reference) including a rollable display unit is disclosed in U.S. Patent Publication No. 2013-0127799. However, since the display apparatus disclosed in the prior art reference uses a driving motor for winding or unwinding the rollable display unit, there is a limitation in quickly winding or unwinding the rollable display unit, and battery consumption power increases due to the driving motor.

SUMMARY

Accordingly, the present invention is directed to providing a rollable display apparatus that substantially obviates one or more problems due to limitations and disadvantages of the related art.

An aspect of the present invention is directed to providing a rollable display apparatus in which a display panel is easily wound and unwound.

Another aspect of the present invention is directed to providing a rollable display apparatus for minimizing a rolling stress applied to a display panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided a rollable display apparatus including: a flexible display panel that includes a pixel array displaying an image; a roller part having a surface for winding the flexible display panel; a first housing receiving the roller part and having a first opening through which a portion of the display panel passes; and a rotational controller coupled between the roller part and the first housing. The rotational controller enables the roller part to rotate in a first direction to unwind the display panel from the surface of the roller part but prevent rotation of the roller part in a second direction opposite the first direction in a first state. The rotational controller, in a second state, enables the roller part to rotate in the second direction to wind the display panel onto the surface of the roller part. The rotational controller switches from the first state to the second state responsive to receiving a triggering operation from a user.

The roller part may include: a first semicylinder part, and a second semicylinder part coupled to the first semicylinder part into a cylindrical tube shape, a second opening provided between the first semicylinder part and the second semicylinder part.

The flexible display panel may include a display driving integrated circuit that is disposed in a portion of a non-display area of the display panel.

The first semicylinder part may include: an outer circumference surface that includes a first curvature; and an inner circumference surface that includes a second curvature less than the first curvature.

In another aspect, there is provided a method of winding or unwinding a flexible display panel of a rollable display device. The display panel is pulled for displaying an image through an opening provided in a housing. In a first state of the rollable display device, a roller part received in the first housing is rotated in a first direction relative to the housing and prevents the roller part from rotating in a second direction opposite the first direction responsive to pulling of the display panel. The rollable display device is switched from the first state to a second state responsive to receiving a triggering operation from a user. Responsive to switching to the second state, the display panel winds onto the roller part through the opening by rotating the roller part in the second direction relative to the housing.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

The terms described in the specification should be understood as follows.

As used herein, the singular forms "a", "an" and "the" are intended to include the plural forms as well, unless the context clearly indicates otherwise. The terms "first" and "second" are for differentiating one element from the other element, and these elements should not be limited by these terms. It will be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof. The term "at least one" should be understood as including any and all combinations of one or more of the associated listed items. For example, the meaning of "at least one of a first item, a second item, and a third item" denotes the combination of all items proposed from two or more of the first item, the second item, and the third item as well as the first item, the second item, or the third item. The term "on" should be construed as including a case where one element is formed at a top of another element and moreover a case where a third element is disposed therebetween.

Hereinafter, exemplary embodiments of a rollable display apparatus according to the present invention will be described in detail with reference to the accompanying drawings. In the specification, in adding reference numerals for elements in each drawing, it should be noted that like reference numerals already used to denote like elements in other drawings are used for elements wherever possible. In the following description, when the detailed description of the relevant known function or configuration is determined to unnecessarily obscure the important point of the present invention, the detailed description will be omitted.

Figure 1:
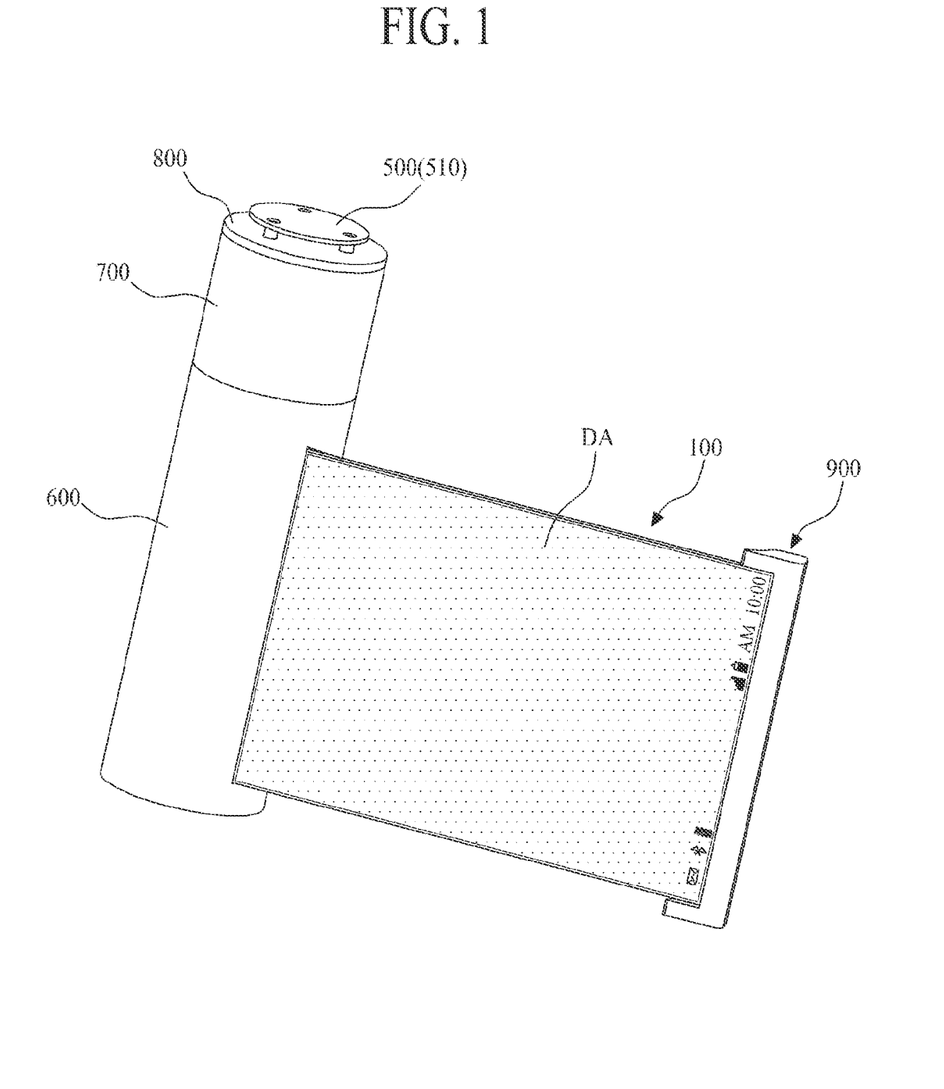
FIG. 1 is a perspective view illustrating a rollable display apparatus according to an embodiment of the present invention.
Figure 2:
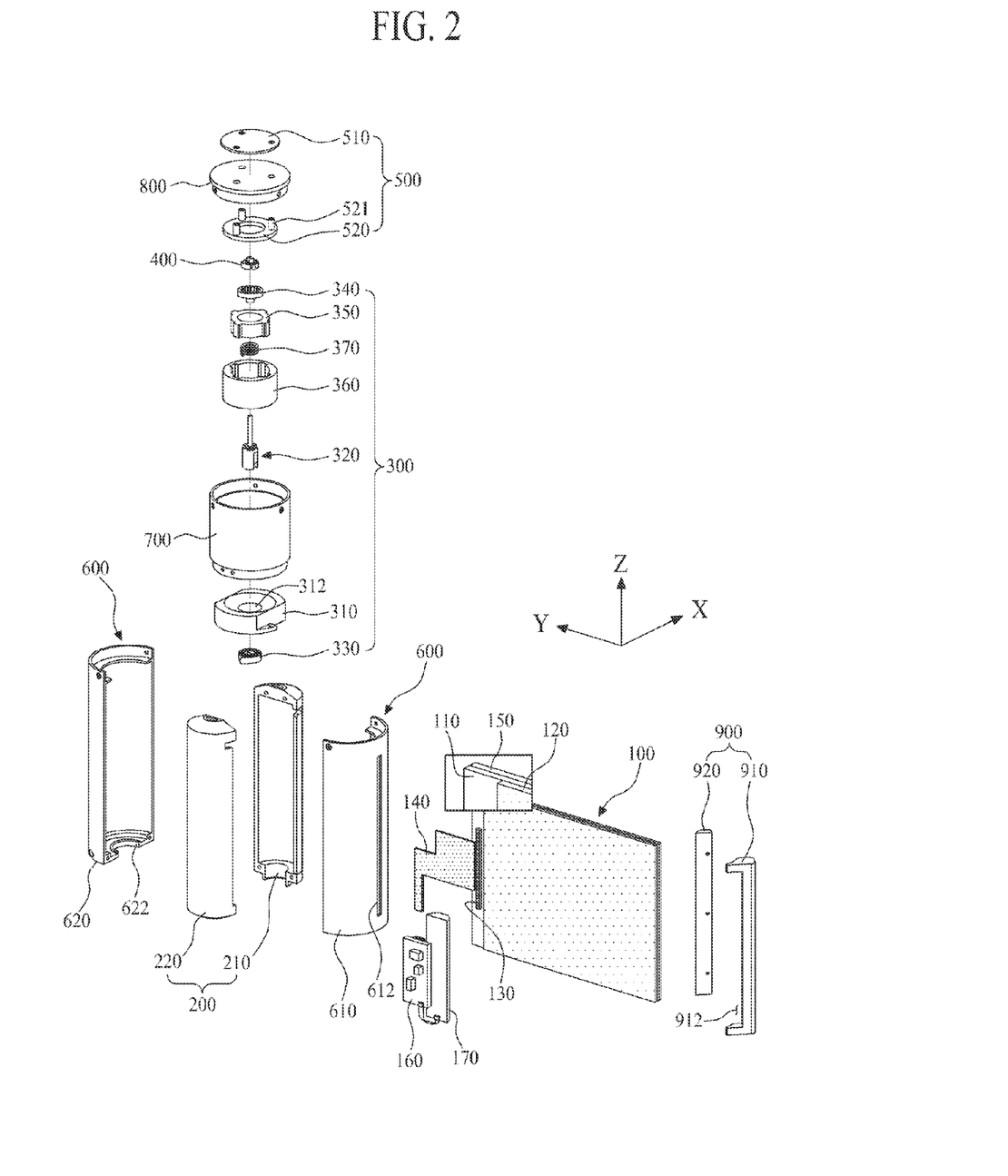
FIG. 2 is an exploded perspective view illustrating a rollable display apparatus according to an embodiment of the present invention.
Figure 3:
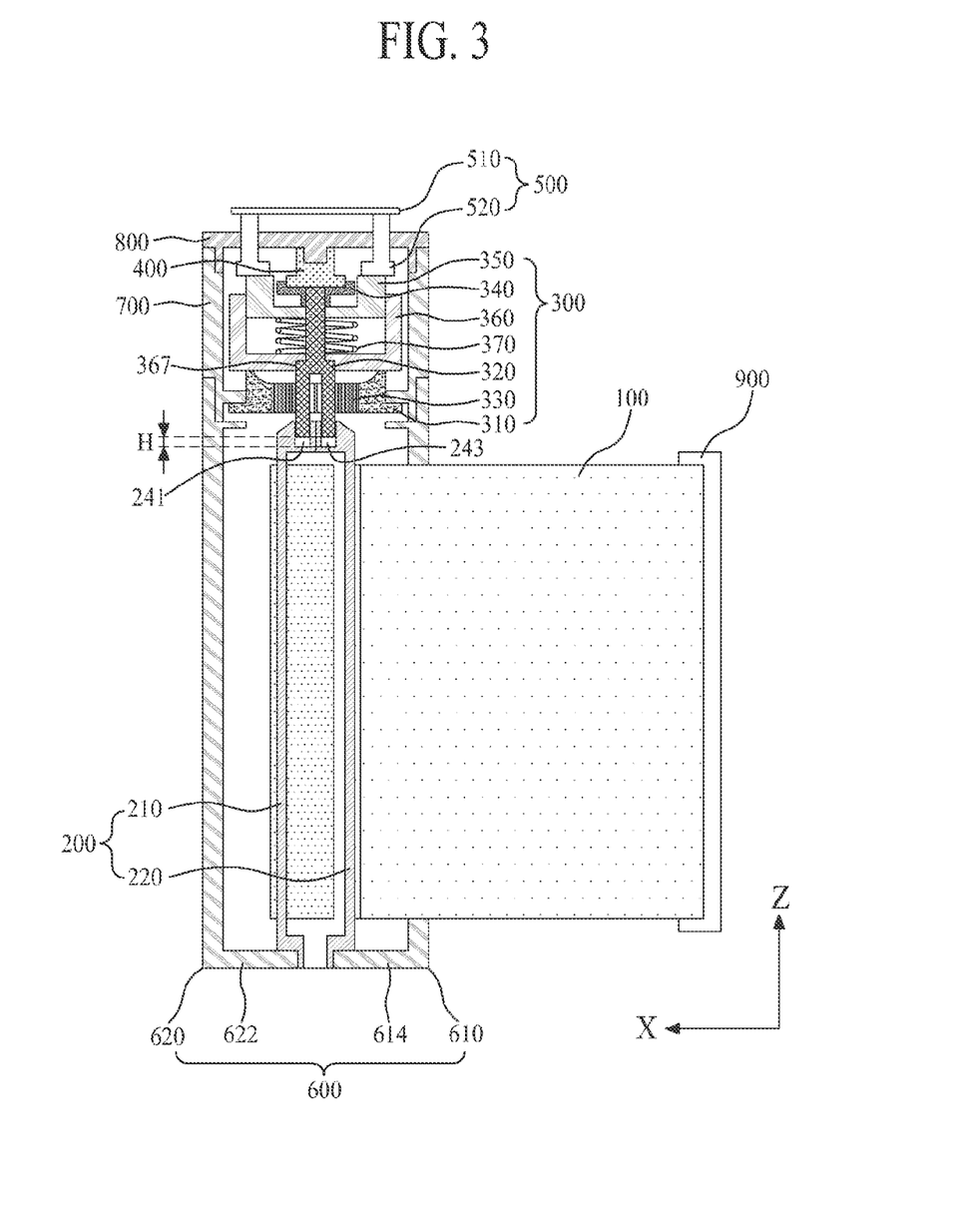
FIG. 3 is a cross-sectional view illustrating a rollable display apparatus according to an embodiment of the present invention.

FIG. 1 is a perspective view illustrating a rollable display apparatus according to an embodiment of the present invention. FIG. 2 is an exploded perspective view illustrating a rollable display apparatus according to an embodiment of the present invention. FIG. 3 is a cross-sectional view illustrating a rollable display apparatus according to an embodiment of the present invention.

Referring to FIGS. 1 to 3, the rollable display apparatus according to an embodiment of the present invention includes a display panel 100, a roller part 200, a rotation part 300, a rotation stopper 400, and a rolling switch unit 500. In one embodiment, the rotation part 300, the rotation stopper 400 and the rolling switch unit 500 may collectively form a rotational controller. Also, the rollable display apparatus according to an embodiment of the present invention may further include a first housing 600, a second housing 700, a cover 800, and a winding stopper 900.

The display panel 100 may be a flat display panel using a flexible substrate. For example, the display panel 100 may be a flexible organic light emitting display panel, a flexible electrophoretic display panel, a flexible liquid crystal display panel, or a flexible electro-wetting display panel.

The display panel 100 may include a flexible substrate 110, a cover member 120, a display driving integrated circuit (IC) 130, and a flexible circuit film 140.

The flexible substrate may be formed of a plastic material. For example, the flexible substrate formed of a plastic material may be formed of at least one selected from polyimide (PI), polycarbonate (PC), polyethylenapthanate (PEN), cyclic olefin polymer (COP), polyethyleneterephthalate (PET), polynorborneen (PNB), and polyethersulfone (PES).

The flexible substrate may include a display area DA and a non-display area that surrounds the display area DA.

A pixel array, which includes a plurality of pixels displaying an image, may be provided in the display area DA of the flexible substrate. Each of the plurality of pixels includes a display device that displays an image corresponding to an image signal. Here, the display device may be an organic light emitting device, a liquid crystal display device, an electrophoretic device, or an electro-wetting display device.

An edge of the display area DA of the flexible substrate exposed to the outside may be coupled to the winding stopper 900.

A display pad part (not shown) and a chip mounting area (not shown), which includes a plurality of input bumps connected to the display pad part and a plurality of output bumps connected to the plurality of pixels, may be provided in the non-display area of the flexible substrate.

The cover member 120 may cover an entire surface of the flexible substrate 110 other than the display pad part. When the display device is the organic light emitting device or the electrophoretic device, the cover member 120 according to an embodiment is formed on a flexible substrate to cover a pixel array, and may be a flexible encapsulation substrate or an encapsulation layer. When the display device is the liquid crystal display device, the electro-wetting display device, or the electrophoretic device, the cover member 120 according to another embodiment may be a flexible color filter substrate that includes a color filter corresponding to a pixel.

In addition, the display panel 100 may further include a polarizing film attached to the cover member 120, but the polarizing film may be omitted for flexibility of the display panel 100.

The rollable display apparatus according to an embodiment of the present invention may further include a touch screen (not shown) for a user interface using a user's touch. The touch screen may be attached onto the display panel 100, or may be built into the display panel 100 in a process of forming the pixel array according to an in-cell touch type. Alternatively, the touch screen may be provided in the cover member 120 through a patterning process.

The display driving IC 130 may be attached to the chip mounting area by a chip bonding process and may display an image on the plurality of pixels according to signals supplied through the display pad part.

The flexible circuit film 140 may be attached to the chip mounting area by the chip bonding process and may transfer various powers and a signal, supplied from a driving system, to the display driving IC 130.

The display panel 100 may be attached to the flexible supporting plate 150. The flexible supporting plate 150 may be attached to an entire rear surface of the display panel 100 and may maintain the flexible display panel 100 in a flat state.

The roller part 200 may be coupled to an internal non-display area of the display panel 100 and may wind the display panel 100 or unwind the wound display panel 100 to a flat state through a rotational motion.

The roller part 200 according to an embodiment, as illustrated in FIGS. 3 to 6, may include a first semicylinder part 210, a second semicylinder part 220, an opening 230, and a rotor connection part 240. In one embodiment, the opening 230 may be shaped as a slit.

Figure 4:
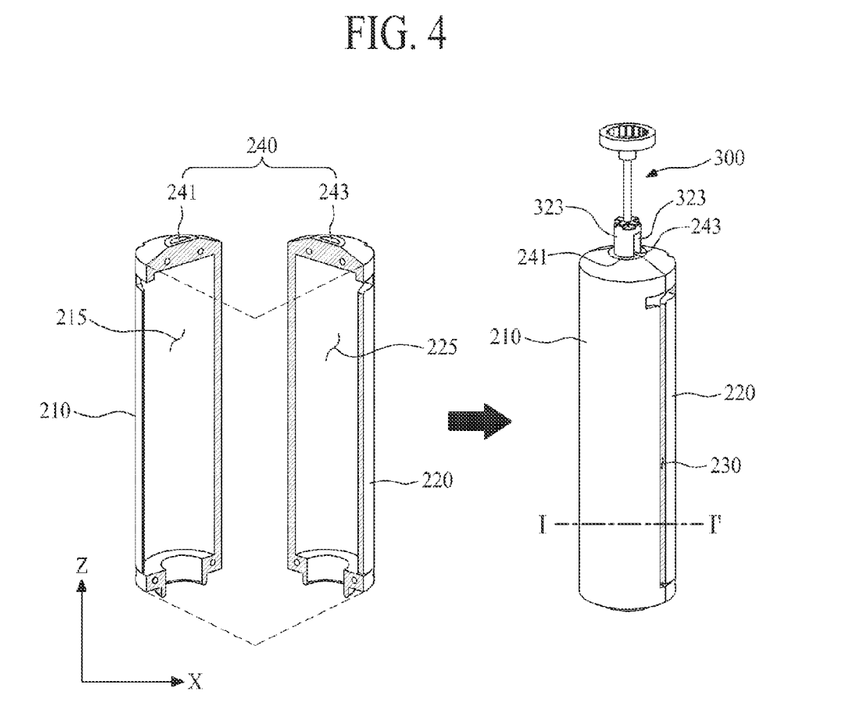
FIG. 4 is a diagram for describing a roller part of FIG. 2.
Figure 5:
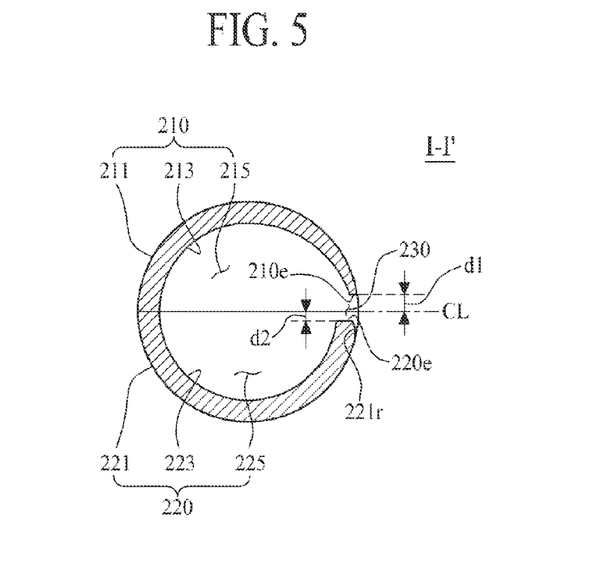
FIG. 5 is a cross-sectional view taken along line I-I' of FIG. 4.
Figure 6:
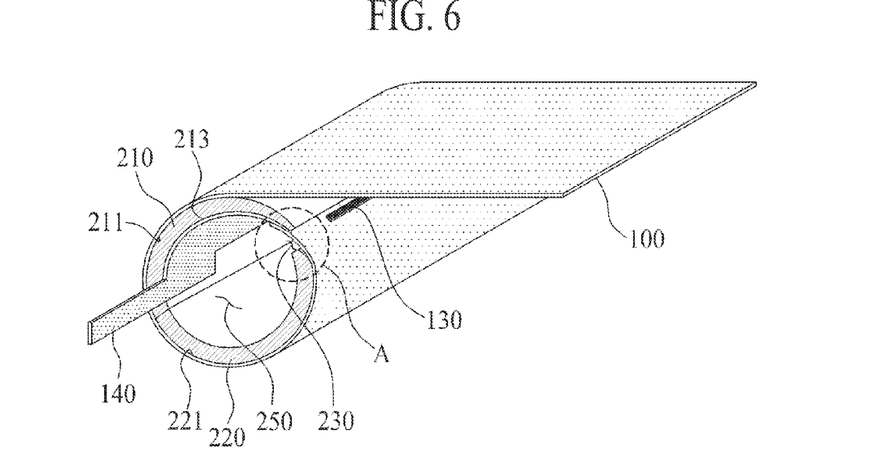
FIG. 6 is a diagram for describing first and second semicylinder parts and a slit illustrated in FIG. 4.

The first semicylinder 210 may be coupled to the internal non-display area of the display panel 100. For example, the first semicylinder 210 may have a semicircular tube shape which includes an outer circumference surface 211, an inner circumference surface 213, and a first hollow part 215 having a semicircular shape. The inner circumference surface 213 of the first semicylinder part 210 may pass through the slit 230 and may be physically coupled to a top of the flexible circuit film 140 inserted into the first hollow part 215. The outer circumference surface 211 of the first semicylinder part 210 may be coupled to the inner circumference surface 213 in the first hollow part 215, may pass the slit 230, and may be physically coupled to one end of a bottom (or a rear surface) of the display panel 100 drawn to the outside. Here, the first semicylinder part 210 may be physically coupled to the flexible circuit film 140 and the display panel 100 by an adhesive, a double-sided tape, a photocurable adhesive resin, or a heat-hardening adhesive resin.

The second semicylinder 220 may be coupled to the first semicylinder part 210 and the internal non-display area of the display panel 100. For example, the second semicylinder 220 may have a semicircular tube shape which includes an outer circumference surface 221, an inner circumference surface 223, and a second hollow part 225 having a semicircular shape. The outer circumference surface 221 of the second semicylinder part 220 may be coupled to the inner circumference surface 213 of the first semicylinder part 210 in the first hollow part 215, may pass the slit 230, and may be physically coupled to the one end of the bottom (or the rear surface) of the display panel 100 drawn to the outside. Here, the second semicylinder part 220 may be physically coupled to the internal non-display area of the display panel 100 by an adhesive, a double-sided tape, a photocurable adhesive resin, or a heat-hardening adhesive resin.

The slit 230 may be provided at one end where the first and second semicylinder parts 210 and 220 are coupled to each other to have a predetermined gap. That is, the slit 230 may be defined as a space which is provided between one ends 210e and 220e of the first and second semicylinder parts 210 and 220 which are coupled to each other to have a cylindrical tube shape but are separated from each other without contacting each other. For example, the slit 230 may be provided between the one end 210e of the first semicylinder part 210, which is separated by a first distance "d1" from a center line CL of the first and second semicylinder parts 210 and 220 which are coupled to each other in a cylindrical tube shape, and the one end 220e of the second semicylinder part 220 which is separated by a second distance "d2" from the center line CL.

The internal non-display area of the display panel 100 coupled to the inner circumference surface 213 of the first semicylinder part 210 may be drawn through the slit 230, and the display driving IC 130 provided in the display panel 100 may be inserted into and disposed in the slit 230. Therefore, the display driving IC 130 may be maintained on the slit 230 in a floating state without contacting instruments other than the display panel 100. As a result, the present invention can prevent the display driving IC 130 from being damaged due to a physical contact with the instruments other than the display driving IC 130.

In addition, in each of the first and second semicylinder parts 210 and 220, when curvatures of the outer circumference surfaces 211 and 221 are identically set and a thickness between the outer circumference surfaces 211 and 221 and the inner circumference surfaces 213 and 223 is the same, the internal non-display area of the display panel 100 passing through the slit 230 may be bent in an S-shape due to a thickness difference between the inner circumference surface 213 of the first semicylinder part 210 and the outer circumference surface 221 of the second semicylinder part 220 in the slit 230. In this case, a bending stress may be applied to the display panel 100 and the flexible circuit film 140, and a plurality of signal lines provided in the flexible film 140 and the display panel 100 can be damaged due to the bending stress.

In order to minimize the bending stress based on a thickness difference between the inner circumference surface 213 of the first semicylinder part 210 and the outer circumference surface 221 of the second semicylinder part 220 in the slit 230, a thickness between the inner circumference surface 213 and the outer circumference surface 211 of the first semicylinder part 210 may be set to be progressively thinned in a direction from the other end to the one end 210e of the first semicylinder part 210, and a curvature of the inner circumference surface 213 of the first semicylinder part 210 may be set to have continuity with the outer circumference surface 221 of the second semicylinder part 220. Also, in order for a curvature of the inner circumference surface 213 of the first semicylinder part 210 and the outer circumference surface 221 of the second semicylinder part 220 to have better continuity, a corner 221r between the one end 220e and the outer circumference surface 221 of the second semicylinder part 220 may be rounded to have a smaller curvature than that of the inner circumference surface 213 of the first semicylinder part 210. For example, the outer circumference surface 211 of the first semicylinder part 210 and the outer circumference surface 221 of the second semicylinder part 220 may be set to have the same curvature, and the inner circumference surface 213 of the first semicylinder part 210 may be set to have a smaller curvature than that of the outer circumference surface 211 of the first semicylinder part 210. Therefore, as illustrated in a portion A of FIG. 6, one end of the display panel 100 passing through the slit 230 may be bent at a certain curvature without being bent in an S-shape in the slit 230 and may be wound on the outer circumference surface 221 f the second semicylinder part 220, and thus, the present invention can minimize a bending stress applied to the display panel 100 and the flexible circuit film 140.

Referring again to FIGS. 2 to 4, the rotor connection part 240 may be connected to the rotation part 300 and is provided with a rotation force based on a rotational motion of the rotation part 300. The rotor connection part 240 according to an embodiment may include a first connection groove 241, which is provided in a top of the first semicylinder part 210, and a second connection groove 243 which is provided in a top of the second semicylinder part 220 in parallel with the first connection groove 241. The first and second connection grooves 241 and 243 may be recessed from the respective tops of the first and second semicylinder parts 210 and 220 to have a predetermined depth, and for example, may have a semicylindrical shape or a polygonal pillar shape.

The roller part 200 may be coupled to the display panel 100 which is inserted into the slit 230, and as a user pulls an external exposure portion of the display panel 100 which is exposed to the outside through the slit 230, the display panel 100 which is rotated and wound in a first direction (or normal rotation) may be unwound (or drawn) to the outside. Also, the roller part 200 may be rotated in the second direction (or reverse rotation) according to a rotational motion transferred from the rotation part 300 to the rotor connection part 240, thereby allowing the display panel 100 to be wound onto the roller part 200.

In addition, referring to FIGS. 2 and 6, the roller part 200 may include a system accommodation space 250. The system accommodation space 250 may be provided in the roller 200 and may be defined by the first and second hollow parts 215 and 225 of the first and second semicylinder parts 210 and 220 which are coupled to each other in a cylindrical tube shape. A driving circuit substrate 160 connected to the flexible circuit film 140 and a battery 170 connected to the driving circuit substrate 160 may be accommodated in the system accommodation space 250. A peripheral circuit module of the rollable display apparatus including a power module, a communication module, and a memory module may be mounted on the driving circuit substrate 160. However, the battery 170 may be accommodated in a separate third housing (not shown) additionally coupled to a rear surface of the first housing 600 without being accommodated in the system accommodation space 250 and may be connected to the driving circuit substrate 160.

Referring again to FIGS. 1 to 4, the first housing 600 may be provided in a cylindrical tube shape to have an opening 612 (or a panel entrance) which the display area DA of the display panel 100 is inserted into and unloaded from. In one embodiment, the opening 612 may be shaped as a slot. The first housing 600 may accommodate the display panel 100 and the roller part 200, and thus protects the display panel 100 which is wound on the roller part 200. The first housing 600 according to an embodiment may include a first housing body 610 and a second housing body 620 which are coupled to each other in a cylindrical tube shape.

The first housing body 610 may be provided in a semicircular tube shape to have the slot 612 which the display area DA of the display panel 100 is inserted into and unloaded from. The first housing body 610 may surround one side of the roller part 200 and may rotatably support a lower portion of the roller part 200 through a first lower guide ring 614 which is provided on a lower inner surface.

The second housing body 620 may be provided in a semicircular tube shape to be coupled to the first housing body 610. The second housing body 620 may surround the other side of the roller part 200 and may rotatably support the lower portion of the roller part 200 through a second lower guide ring 622 which is provided on the lower inner surface.

The second housing 700 may be detachably coupled to a top of the first housing 600 and may accommodate the rotation part 300, thereby protecting the rotation part 300. The second housing 700 according to an embodiment may be provided in a cylindrical tube shape having the same diameter as that of the first housing 600.

The cover 800 may be detachably coupled to a top of the second housing 700 and may cover the top of the second housing 700.

The winding stopper 900 may be coupled to a front edge of the display panel 100 exposed to the outside through the slot 612 of the first housing 600. The winding stopper 900 may maintain the front edge of the display panel 100 in a flat state and prevent an entirety of the display panel 100 from being wound and inserted into the first housing 600. The winding stopper 900 may be used as a panel drawing handle which enables the user to manually unwind the display panel 100, wound on the roller part 200, to a flat state.

Figure 7:
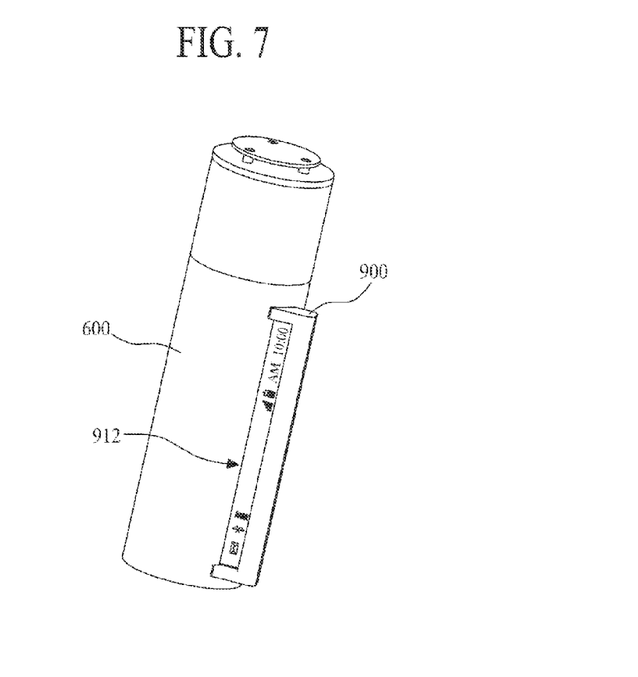
FIG. 7 is a diagram for describing a winding stopper according to an embodiment of the present invention.

Particularly, as illustrated in FIG. 7, the winding stopper 900 may include a window 912 which overlaps with a portion of the display area DA of the display panel 100 wound on the roller part 200. Information about a state of the rollable display apparatus and additional information such as a brief text message may be displayed on the portion of the display area DA of the display panel 100 overlapping the window 912. Therefore, the present invention may provide the user with the information about the state of the rollable display apparatus and the additional information such as the brief text message even in a state where the display panel 100 is wound on the roller part 200.

The winding stopper 900 according to an embodiment may include an upper frame 910 and a lower frame 920.

The upper frame 910 according to an embodiment may cover a top of the front edge of the display panel 100 in order for a portion of the display area DA of the display panel 100 to be exposed to the outside. The upper frame 910 may be provided in a flat ]-shape.

The upper frame 910 according to another embodiment may be formed of a transparent material to have a flat |-shape and may expose a portion of the display area DA of the display panel 100 to the outside.

The lower frame 920 may be detachably coupled to the upper frame 910 and may cover a bottom of the front edge of the display panel 100. A buffering pad (not shown) may be provided on an inner surface of the lower frame 920. When the display panel 100 is being wound on the roller part 200, the buffering pad may buffer an impact which is applied to the first housing 600 by the lower frame 920.

Referring again to FIGS. 1 to 4, the rotation part 300 may be rotatably coupled to the roller part 200. When the display panel 100 wound on the roller part 200 is drawn to the outside, rotation of the rotation part 300 in a second direction (or reverse rotation) may be restricted by contact with the rotation stopper 400, and the rotation part 300 may rotate in a first direction (or normal rotation) opposite to the second direction. Also, when the rotation part 300 is detached from the rotation stopper 400, the rotation part 300 may rotate the roller part 200 in the second direction by using an elastic restoration force and thus may allow the display panel 100, unfolded to a flat state, to be wound on the roller part 200.

As illustrated in FIGS. 2, 3, 8 and 9, the rotation part 300 according to an embodiment may include a holder 310, a rotation axis member 320, a rotation force providing unit 330, a rotation member 340, a lifter 350, a guider 360, and a position restoring member 370.

Figure 8:
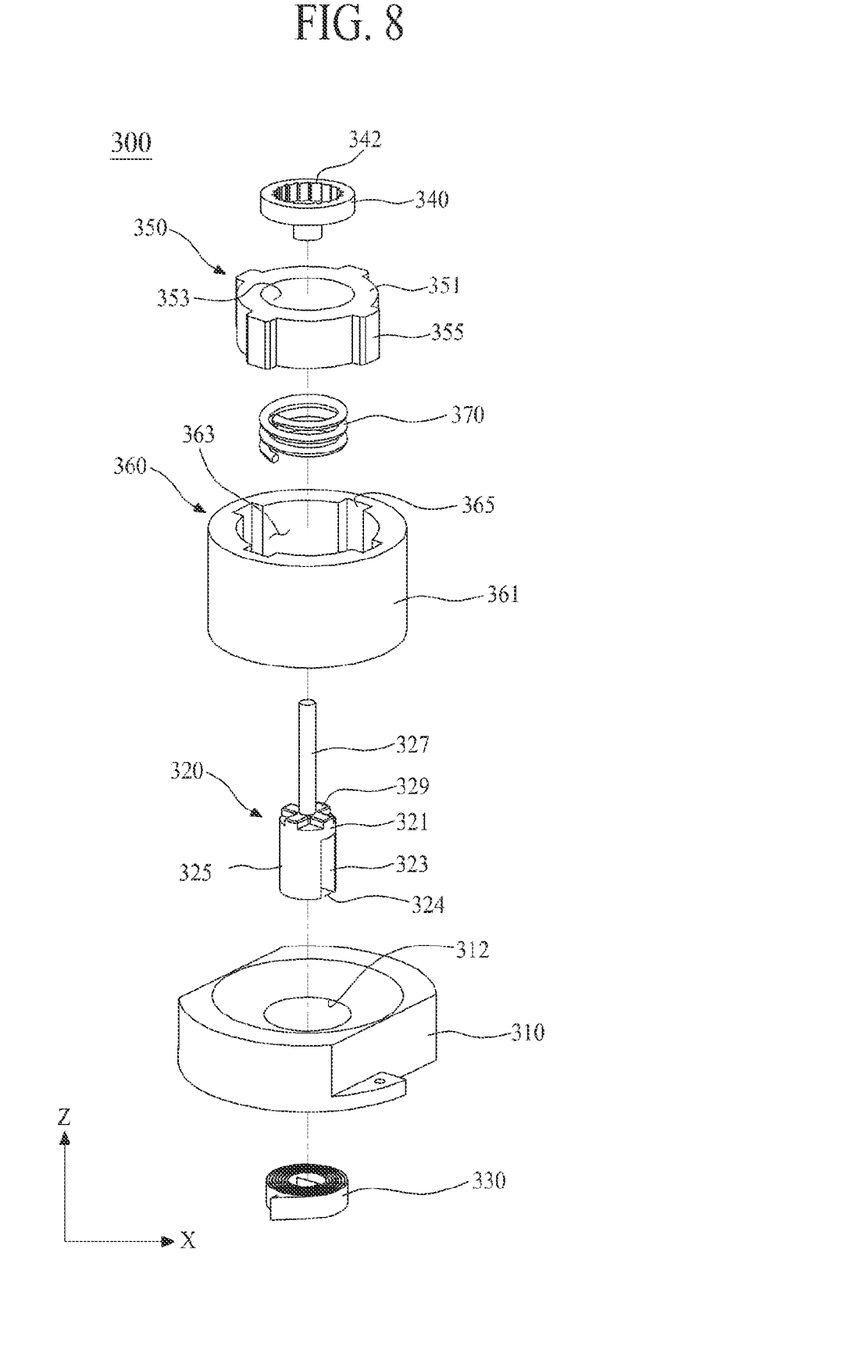
FIG. 8 is an exploded perspective view of a rotation part illustrated in FIG. 2.
Figure 9:
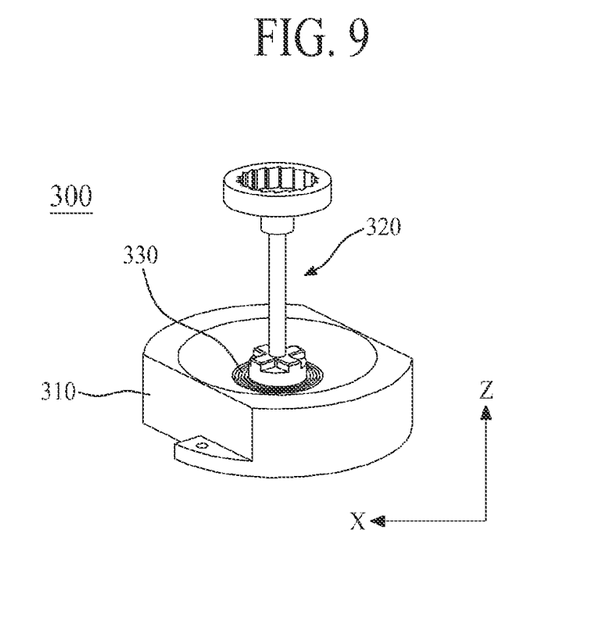
FIG. 9 is a diagram illustrating a coupling structure of a holder, a first elastic member, and a rotation axis member illustrated in FIG. 8.

The holder 310 may be provided in a cylindrical shape having a circular internal hole 312 and may support the rotation force providing unit 330. The holder 310 may be coupled to a rear surface of the second housing 700 to be described below.

The rotation axis member 320 may pass through the internal hole 312 of the holder 310 and may be connected to the above-described rotor connection part 240 of the roller part 200. The rotation axis member 320 according to an embodiment may include an axis body 321, a pair of rotors 323 and 325, a rotation shaft 327, and a coupling projection 329.

The axis body 321 may be provided in a cylindrical shape which has a certain height and a diameter that enables the axis body 321 to be inserted into the internal hole 312 of the holder 310.

The pair of rotors 323 and 325 may be vertically disposed to have a predetermined height from a bottom of the axis body 321, so as to be parallel to each other with a gap 324 therebetween. Lower portions of the pair of rotors 323 and 325, as illustrated in FIGS. 2 to 4, may be respectively inserted into the first and second connection grooves 241 and 243 of the rotor connection part 240 which is provided in the roller part 200. In this case, bottoms of the pair of rotors 323 and 325 may be separated by a predetermined lifting height H from bottoms of the first and second connection grooves 241 and 243, respectively. Here, the lifting height H may act as a space for detaching the rotation axis member 320 from the rotation stopper 400.

The rotation shaft 327 may be provided in a vertical cylinder shape to have a predetermined height and may be physically coupled to a center of a top of the axis body 321. The rotation shaft 327 may pass through the guider 360, the position restoring member 370, and the lifter 350 and may be coupled to the rotation member 340.

The coupling projection 329 may protrude by a predetermined height from the top of the axis body 321 to have a +-shaped plane. Here, the coupling projection 329 may have a −-shaped, |-shaped, or *-shaped plane in addition to the +-shaped plane. The coupling projection 329 may be inserted into a bottom of the guider 360.

The rotation force providing unit 330 may provide a rotation force to the rotation axis member 320 according to an elastic restoration force. The rotation force providing unit 330 may be connected to a lower side of the rotation axis member 320 and may be inserted into and fixed to the internal hole 312 of the holder 310. In this case, an inner end of the rotation force providing unit 330 may be inserted into and disposed in the gap 324 between the pair of rotors 323 and 325 which are provided in the rotation axis member 320, and an outer end of the rotation force providing unit 330 may be fixed to the internal hole 312 of the holder 310. The rotation force providing unit 330 may be compressed according to rotation of the rotation axis member 320 which rotates in cooperation with a first-direction rotation (or normal rotation) of the roller part 200, and by rotating the rotation axis member 320 in the second direction (or reverse rotation) with a compressed elastic restoration force, and the rotation force providing unit 330 may rotate the roller part 200 in the second direction. The rotation force providing unit 330 may be a first elastic member having an elastic restoration force, and more particularly, may be a spiral spring.

The rotation member 340 may be coupled to the rotation shaft 327 of the rotation axis member 320 and may rotate according to rotation of the rotation shaft 327. The rotation member 340 according to an embodiment may be an internal gear in which an inner gear is provided in a cylinder. In this case, the internal gear may have a perpendicular shape and a curved surface (or an inclined surface) in order for the rotation member 340 to rotate in only one direction.

The lifter 350 may support and raise/lower the rotation member 340. The lifter 350 according to an embodiment may include a circle-shaped lifting body 351, which includes an insertion groove 352 into which the rotation member 340 is inserted, and a plurality of rails 355 which protrude from an outer surface of the lifting body 351 at certain intervals.

Figure 10:
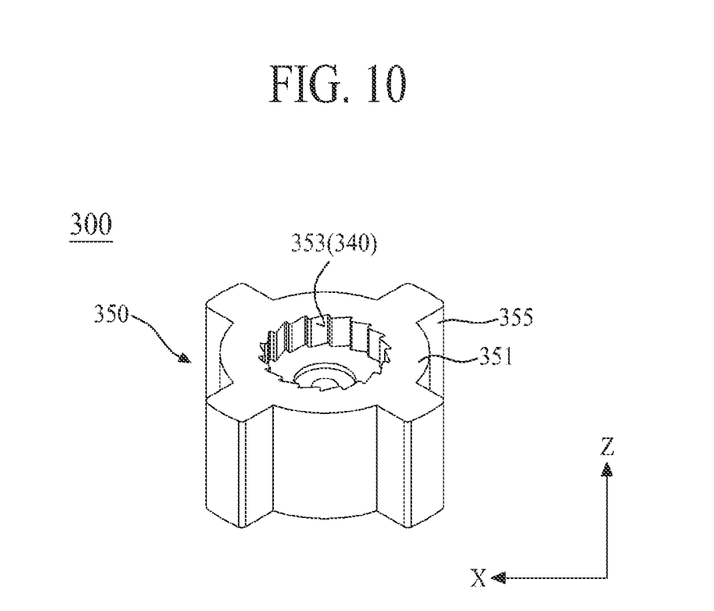
FIG. 10 is a diagram for describing a modification example of a lifter illustrated in FIG. 8.

In addition, as illustrated in FIG. 10, the lifter 350 may include the rotation member 340. That is, the rotation member 340 may be integrated with a top of the lifter 350. In this case, the lifter 350 may include a cylinder-shaped lifting body 351 which includes a circular groove having a certain depth, an internal gear 353 which is provided on an inner surface of the circular groove, and a plurality of rails 355 which protrude from the outer surface of the lifting body 351 at certain intervals.

Referring again to FIG. 8, the guider 360 may accommodate the lifter 350 and may be connected to the coupling projection 329 of the rotation axis member 320. The guider 360 according to an embodiment may include a circle-shaped guider body 361 that includes an elevation groove 363 into which the lifter 350 is inserted to be ascendable and descendable, a plurality of guide grooves 365 which are recessed from an inner surface of the guider body 361 at certain intervals, and a coupling groove 367 which is provided in a bottom of the guider body 361 in order for the coupling projection 329 to be inserted thereinto. The guider 360 may be accommodated in the second housing 700 and may rotate along with the rotation axis member 320.

The position restoring member 370 may be disposed between the guider 360 and the lifter 350 and may raise the lifter 350, which is lowered by a certain height by the rolling switch unit 500, to a groove position. The position restoring member 370 according to an embodiment may include a second elastic member that is disposed on a bottom of the elevation groove 363 of the guider 360 and raises the lifter 350 according to a compression restoration force. Here, the second elastic member may be a coil spring, for example, a compression spring.

Referring again to FIGS. 1 to 3, the rotation stopper 400 may be selectively connected to the rotation part 300. The rotation stopper 400 may physically contact the rotation part 300 to allow the rotation part 300 to rotate in only the first direction (or normal rotation), and thus, the display panel 100 wound on the roller part 200 may be drawn to outside of the first housing 600, thereby preventing the drawn display panel 100 from being wound to the inside the first housing 600 by an elastic restoration force of the rotation force providing unit 330. Also, the rotation stopper 400 may be detached from the rotation part 300 according to pressure being applied by the rolling switch unit 500, and thus enables the rotation part 300 to rotate in the second direction (or reverse rotation), whereby the display panel 100 exposed to outside of the first housing 600 may be wound on the roller part 200. As illustrated in FIGS. 2, 3, 11 and 12, the rotation stopper 400 according to an embodiment may include a stopper body 410, a plurality of stopper wings 420, and a pair of supports 430.

Figure 11:
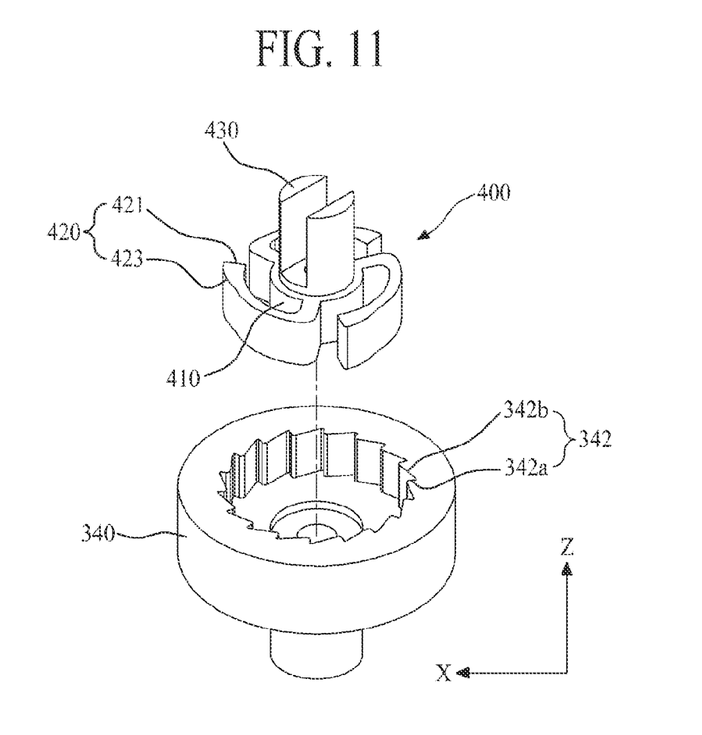
FIG. 11 is a diagram enlarging and illustrating a rotation stopper and a rotation member illustrated in FIG. 2.
Figure 12:
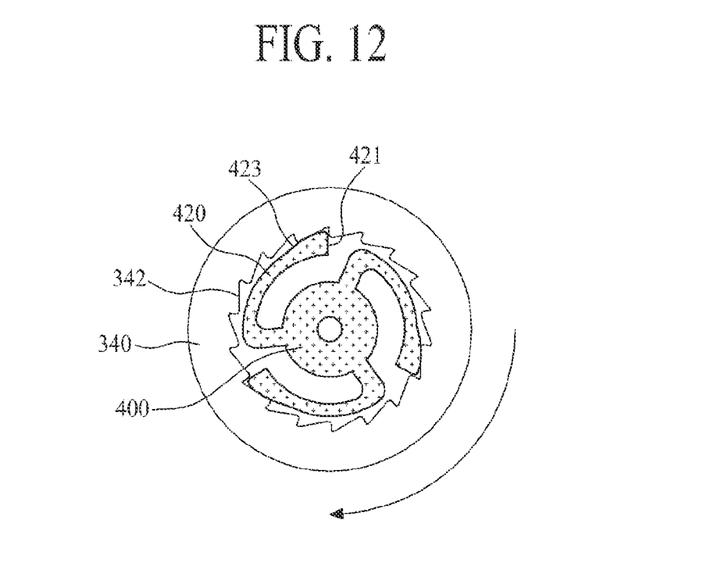
FIG. 12 is a plan view illustrating a coupling structure of the rotation stopper and the rotation member illustrated in FIG. 2.

The stopper body 410 may be provided in a circular shape to be inserted into a cylinder which is provided in the rotation member 340 of the rotation part 300. The stopper body 410 may be physically coupled to a bottom of the cover 800. For example, the stopper body 410 may be coupled to the cover 800 by a screw.

The plurality of stopper wings 420 may protrude in an L-shape from an outer surface of the stopper body 410 to have an elastic force and a predetermined interval. For example, each of the plurality of stopper wings 420 may include a rotation restricting surface 421, which is provided in parallel with a rotation restricting surface 342*a* of the internal gear 342 provided in the rotation member 340 and restricts rotation of the rotation member 340 in the second direction (or reverse rotation), and a curvature surface 423 that is provided in a curved shape from the rotation restricting surface 421 and enables the rotation member 340 to rotate in only the first direction (or normal rotation). Each of the plurality of stopper wings 420 may be elastically modified according to a shape of a curved surface 342*b* of the internal gear 342 which is provided in the rotation member 340, and thus may allow the rotation part 340 to rotate in only the first direction (or normal rotation).

The pair of supports 430 may protrude from a top of the stopper body 410 to have a certain height and may maintain a distance between the stopper body 410 and a bottom of the cover 800. Here, the rotation stopper 400 according to an embodiment may include one support which protrudes in a cylindrical shape from the top of the stopper body 410, instead of the pair of supports 430.

Referring again to FIGS. 1 to 3, the rolling switch unit 500 may detach the rotation part 300 from the rotation stopper 400, and thus enables the rotation part 300 to be rotated in the second direction (or reverse rotation) by an elastic restoration force. The rolling switch unit 500 according to an embodiment may include a switch button 510 and a pusher 520.

The switch button 510 may be disposed outside the cover 800 to have a circular plate shape and may be exposed to outside of the rollable display apparatus. That is, the present invention exposes the switch button 510 on the cover 800 and thus facilitates a user's manipulation for winding the unfolded display panel 100 to the inside the first housing 600.

The pusher 520 may be accommodated in the second housing 700 to be disposed between the cover 800 and the rotation part 300 and may be coupled to the switch button 510 through the cover 800. The pusher 520 may detach the rotation stopper 400 from the rotation member 340 according to pressure being applied to the switch button 510, and thus may allow the display area DA of the display panel 100, exposed outside of the first housing 600, to be automatically wound on the roller part 200 by an elastic restoration force of the rotation force providing unit 330.

Figure 13:
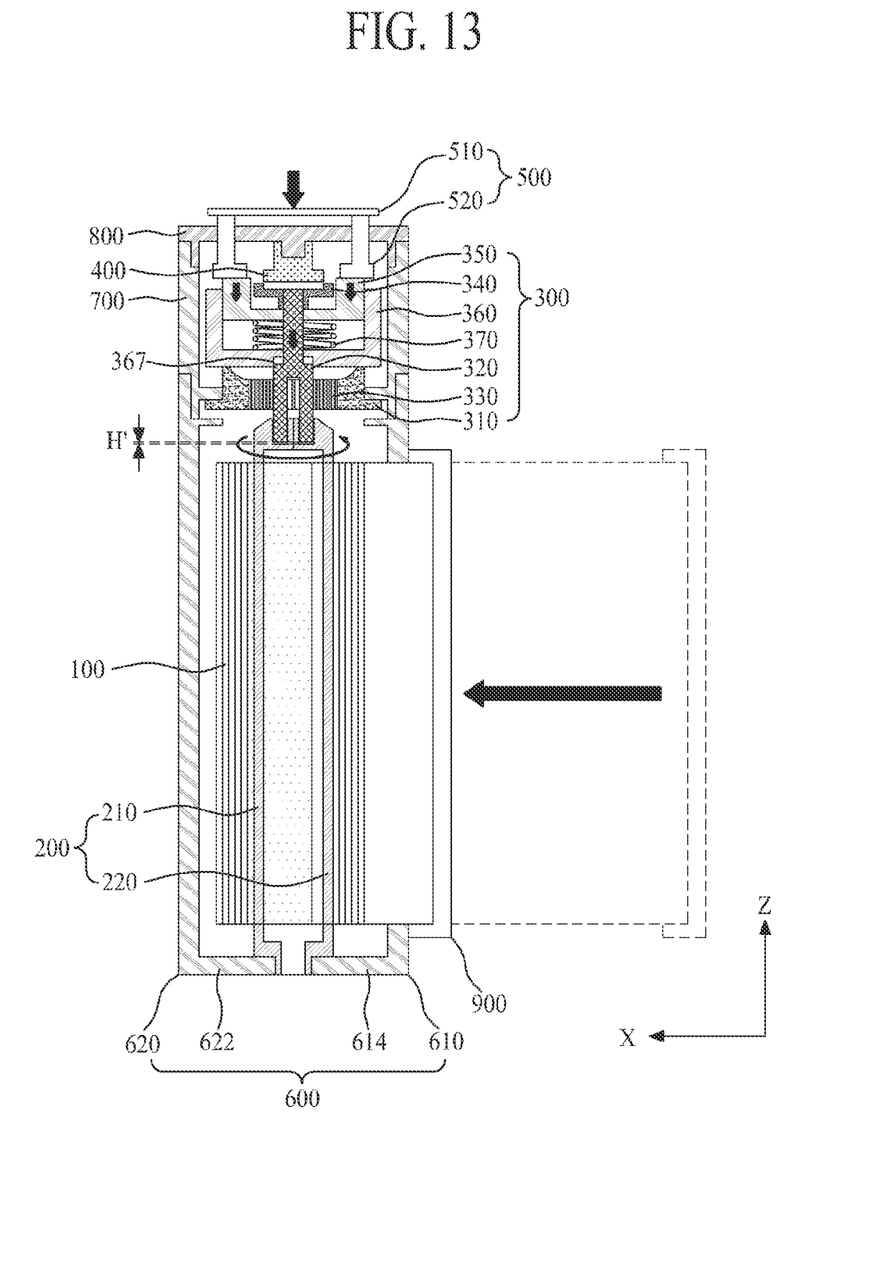
FIG. 13 is a diagram for describing a winding operation of a display panel in a rollable display apparatus according to an embodiment of the present invention.

In detail, as illustrated in FIG. 13, when the user pushes the switch button 510 and pressure is applied to the switch button 510, the pusher 520 may pressurize and lower the lifter 350 of the rotation part 300 according to the pressure applied to the switch button 510, the lifter 350 of the rotation part 300 and the guider 360 may lower the rotation axis member 320 while compressing the position restoration member 370 according to pressure applied from the pusher 520, and the rotation member 340 may be lowered according to the rotation axis member 320 being lowered. Therefore, since the rotation stopper 400 which restricts rotation of the rotation member 340 in the second direction is detached from the rotation member 340, the rotation axis member 320 may be quickly rotated in the second direction by an elastic restoration force of the rotation force providing unit 330, and the roller part 200 may be rotated in the second direction by a rotation force of the rotation axis member 320, whereby the display area DA of the display panel 100 exposed to outside the first housing 600 may be wound on the roller part 200. At this time, winding of the display panel 100 on the roller part 200 is stopped according to the winding stopper 900 contacting an outer wall of the first housing 600.

Moreover, when pressure applied to the switch button 510 is released by the user, the pusher 520 may raise the rotation axis member 320 and the lifter 350 of the rotation part 300 according to a compression restoration force of the position restoring member 370 of the rotation part 300 which is compressed by the pressure applied to the switch button 510, and thus, the rotation member 340 of the rotation part 300 may physically contact the rotation stopper 400. Therefore, a second-direction rotation of the rotation member 340 may be restricted, and the switch button 510 may return to a groove position according to the lifter 350 of the rotation part 300 being raised.

As described above, in the rollable display apparatus according to an embodiment of the present invention, since the rotation member 340 is detached from the rotation stopper 400 by a simple pushing operation of the rolling switch 500, the display panel 100 unfolded to the outside is quickly wound to inside the first housing 600. Therefore, the display panel 100 is easily wound and unwound by using simple elements such as the elastic member 330 and the rotation stopper 400, and an unfolded state of the display panel 100 is maintained.

Figure 14:
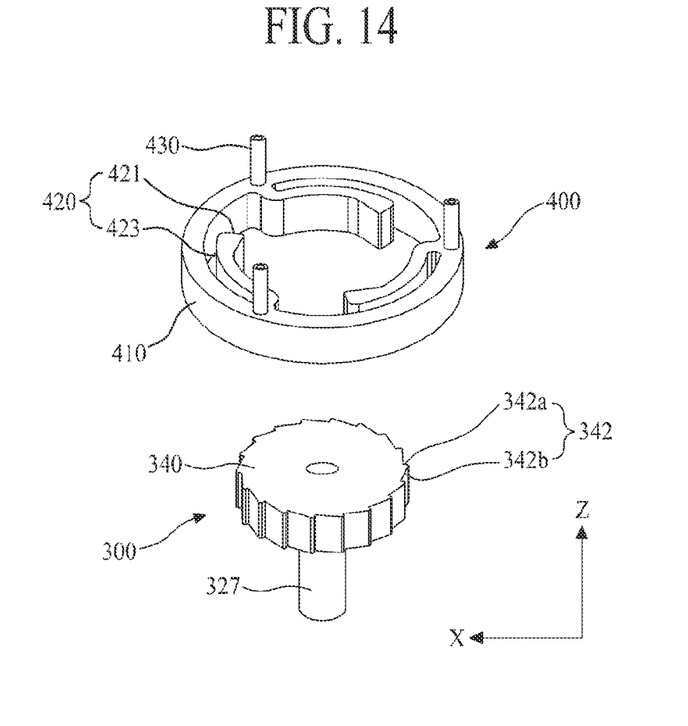
FIG. 14 is a diagram for describing a rotation stopper and a rotation member according to a modification example in a rollable display apparatus according to an embodiment of the present invention.

FIG. 14 is a diagram for describing a rotation stopper and a rotation member according to a modification example in a rollable display apparatus according to an embodiment of the present invention.

Referring to FIG. 14, a rotation member 340 of a rotation part 300 according to a modification example may be coupled to a rotation shaft 327 of a rotation axis member and may rotate according to rotation of the rotation shaft 327. The rotation member 340 may include an external gear 342 in which an outer gear is provided on an outer side of a cylinder. Here, the external gear 342 may have a perpendicular shape and a curved surface (or an inclined surface) in order for the rotation member 340 to rotate in only one direction.

A rotation stopper 400 according to a modification example may include a stopper body 410, a plurality of stopper wings 420 which are provided on an inner surface of the stopper body 410, and a pair of supports 430 which are provided on a top of the stopper body 410.

The stopper body 410 may be provided in a circular ring shape into which the rotation member 340 of the rotation part 300 is inserted. The stopper body 410 may be physically coupled to a bottom of a cover 800 by a screw.

The plurality of stopper wings 420 may protrude in an L-shape from an inner surface of the stopper body 410 to have an elastic force and a predetermined interval. For example, each of the plurality of stopper wings 420 may include a rotation restricting surface 421, which is provided in parallel with a rotation restricting surface 342*a* of the external gear 342 provided in the rotation member 340 and restricts rotation of the rotation member 340 in the second direction (or reverse rotation), and a curvature surface 423 that is provided in a curved shape from the rotation restricting surface 421 and enables the rotation member 340 to rotate in only the first direction (or normal rotation). Each of the plurality of stopper wings 420 may be elastically modified according to a shape of a curved surface 342*b* of the external gear 342 which is provided in the rotation member 340, and thus may allow the rotation part 340 to rotate in only the first direction (or normal rotation).

The pair of supports 430 may protrude from a top of the stopper body 410 to have a certain height and may maintain a distance between the stopper body 410 and a bottom of the cover 800.

Figure 15:
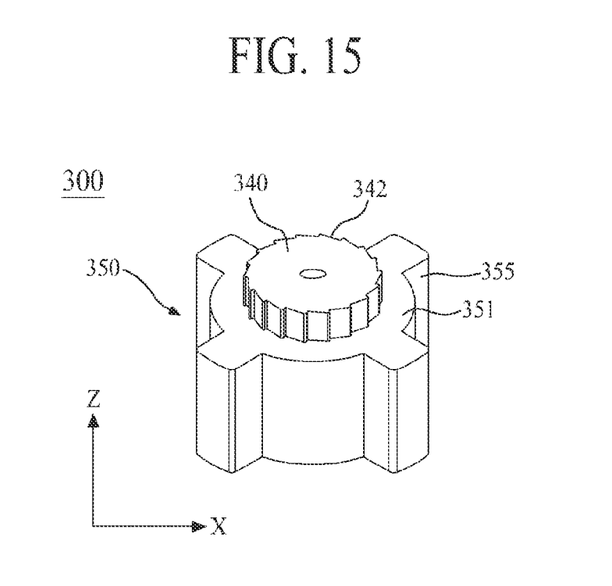
FIG. 15 is a diagram for describing another modification example of the lifter illustrated in FIG. 8.

In addition, as illustrated in FIG. 15, the rotation member 340 may be integrated with the lifter 350. In this case, the rotation member 340 including the external gear 342 may be provided on a top of the lifter 350 as one body. When the rotation member 340 physically contacts the rotation stopper 400, the lifter 350 may rotate in only the first direction (or normal rotation). When the rotation member 340 is lowered according to pressure applied to the rolling switch unit 500, the rotation member 340 may be detached from the rotation stopper 400, and thus, the lifter 350 may rotate in the second direction (or reverse rotation). As mentioned above, a rotational controller may include the components of the rotation part 300, the rotation stopper 400 and the rolling switch unit 500 described above, but can also include any configuration that enables the roller part to rotate in the first direction to unwind the display panel from the surface of the roller part but prevents rotation of the roller part in the second direction, and also enables the roller part to rotate in the second direction to wind the display panel back onto the surface of the roller part responsive to receiving a triggering operation or force from a user.

As described above, according to the embodiments of the present invention, the display panel is easily wound and unwound, a rolling stress applied to the display panel is minimized, and a damage of a display driving IC is minimized.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A rollable display apparatus comprising:
    a flexible display panel that includes a pixel array displaying an image;
    a roller part having a surface for winding the flexible display panel;
    a first housing receiving the roller part and having a first opening through which a portion of the display panel passes; and
    a rotational controller coupled between the roller part and the first housing, the rotational controller configured to:
        in a first state, enable the roller part to rotate in a first direction to unwind the display panel from the surface of the roller part but prevent rotation of the roller part in a second direction opposite the first direction,
        in a second state, enable the roller part to rotate in the second direction to wind the display panel onto the surface of the roller part, and
        switch from the first state to the second state responsive to receiving a triggering operation from a user,
    wherein the rotational controller comprises:
        a rotation part having a first end coupled to a first end of the roller part in a rotatable manner; and
        a rotation stopper contacting the rotation part in the first state,
        wherein the rotation part comprises:
            a holder having an internal hole;
            a rotation axis member that is connected to the roller part through the internal hole;
            a rotation force providing unit that is connected to a lower end of the rotation axis member and is inserted into the internal hole;
            a rotation member that is coupled to the rotation axis member and contacts the rotation stopper when the rotational controller is in the first state;
            a lifter that receives the rotation member;
            a guider that is supported by the holder and configured to guide rising and lowering of the lifter; and
            a position restoring member that is disposed between the guider and the lifter.

2. The rollable display apparatus of claim 1, wherein the rotational controller further comprises:
    a rolling switch unit coupled to a second end of the rotation part and configured to detach the rotation stopper from the rotation part in the second state.

3. The rollable display apparatus of claim 2, wherein the rotation member is coupled to the roller part and rotates with the roller part, the rotational controller placed in the first state when the rotation member is contacting the rotation stopper, and the rotational controller transitions from the first state to the second state when the rotation stopper detaches from the rotation member responsive to receiving force from the user on the rolling switch unit as the triggering operation, and
    wherein the rotation force providing unit provides a rotation force for rotating the rotation member in the second direction.

4. The rollable display apparatus of claim 3, further comprising a winding stopper coupled to a front edge of the display panel outside of the first housing through the first opening, the winding stopper comprising a window that overlaps with a portion of a display area of the display panel.

5. The rollable display apparatus of claim 2, further comprising:
    a second housing that is coupled to the first housing receiving the rotation part and the rotation stopper; and
    a cover that covers one end of the second housing,
    wherein the rolling switch unit comprises a switch button disposed outside of the cover, the rotation part detached from the rotation stopper responsive to the rolling switch unit receiving force from the user on the rolling switch unit as the triggering operation.

6. The rollable display apparatus of claim 5, wherein the rolling switch unit further comprises a pusher that is connected to the switch button through the cover, the pusher is configured to detach the rotation part from the rotation stopper by lowering the rotation part responsive to receiving the force from the user on the switch button.

7. The rollable display apparatus of claim 6, wherein the lifter is lowered responsive to the pusher being lowered by the force from the user on the switch button.

8. The rollable display apparatus of claim 7, wherein, the rotation member comprises a plurality of gears provided on an inner side surface or outer side surface of the rotation member, and
    the rotation stopper comprises a plurality of stopper wings provided on an outer side surface or an inner side surface of the rotation stopper,
    wherein the plurality of gears and the plurality of stopper wings are configured to prevent the rotation of the rotation part and the roller part in the second direction and allow rotation of the rotation part and the roller part in the first direction when the rotation member is contacting the rotation stopper.

9. The rollable display apparatus of claim 8, wherein the rotation member is integrated with a top part of the lifter.

10. The rollable display apparatus of claim 2, wherein the roller part comprises:
   a first semicylinder part, and
   a second semicylinder part coupled to the first semicylinder part into a cylindrical tube shape, a second opening provided between the first semicylinder part and the second semicylinder part,
   wherein a portion of the display panel is coupled to the first semicylinder part and the second semicylinder part through the second opening.

11. The rollable display apparatus of claim 10, wherein the display panel comprises a display driving integrated circuit (IC) that is disposed in a portion of a non-display area of the display panel disposed inside the first housing.

12. The rollable display apparatus of claim 11, wherein the first semicylinder part comprises an inner circumference surface and an outer circumference surface, and a thickness between the inner circumference surface and the outer circumference surface is progressively thinned in a direction from a first end of the first semicylinder part to a second end of the first semicylinder part, the first end of the first semicylinder part closer to the second opening than the second end of the first semicylinder part.

13. The rollable display apparatus of claim 11, wherein the first semicylinder part comprises:
   an outer circumference surface of a first curvature; and
   an inner circumference surface of a second curvature smaller than the first curvature.

14. The rollable display apparatus of claim 13, wherein the second semicylinder part comprises an outer circumference surface that has the same first curvature as the outer circumference surface of the first semicylinder part, and
   a corner between a first end of the second semicylinder part and the outer circumference surface of the second semicylinder part is rounded at a third curvature less than the second curvature of the first semicylinder part, the first end of the second semicylinder part closer to the second opening than a second end of the second semicylinder part.

15. An assembly for operating a rollable display apparatus, comprising:
   a roller part having a surface for winding a flexible display panel that includes a pixel array displaying an image;
   a first housing receiving the roller part and having a first opening through which a portion of the display panel passes; and
   a rotational controller coupled between the roller part and the first housing, the rotational controller configured to:
   in a first state, enable the roller part to rotate in a first direction to unwind the display panel from the surface of the roller part but prevent rotation of the roller part in a second direction opposite the first direction,
   in a second state, enable the roller part to rotate in the second direction to wind the display panel onto the surface of the roller part, and
   switch from the first state to the second state responsive to receiving a triggering operation from a user,
   wherein the rotational controller comprises:
   a rotation part having a first end coupled to a first end of the roller part in a rotatable manner; and
   a rotation stopper contacting the rotation part in the first state,
   wherein the rotation part comprises:
      a holder having an internal hole;
      a rotation axis member that is connected to the roller part through the internal hole;
      a rotation force providing unit that is connected to a lower end of the rotation axis member and is inserted into the internal hole;
      a rotation member that is coupled to the rotation axis member and contacts the rotation stopper when the rotational controller is in the first state;
      a lifter that receives the rotation member;
      a guider that is supported by the holder and configured to guide rising and lowering of the lifter; and
      a position restoring member that is disposed between the guider and the lifter.

* * * * *